(12) United States Patent
Taylor et al.

(10) Patent No.: US 7,786,418 B2
(45) Date of Patent: Aug. 31, 2010

(54) MULTIMODE SEEKER SYSTEM WITH RF TRANSPARENT STRAY LIGHT BAFFLES

(75) Inventors: Byron B. Taylor, Tucson, AZ (US); David G. Jenkins, Tuscon, AZ (US)

(73) Assignee: Raytheon Company, Waltham, MA (US)

( * ) Notice: Subject to any disclaimer, the term of this patent is extended or adjusted under 35 U.S.C. 154(b) by 64 days.

(21) Appl. No.: 12/276,201

(22) Filed: Nov. 21, 2008

(65) Prior Publication Data

US 2010/0127113 A1    May 27, 2010

(51) Int. Cl.
*F41G 7/22*   (2006.01)
*F42B 15/01*  (2006.01)
*F41G 7/00*   (2006.01)
*F42B 15/00*  (2006.01)

(52) U.S. Cl. .................. 244/3.16; 244/3.1; 244/3.15; 342/61; 342/62

(58) Field of Classification Search ............ 250/200, 250/201.1, 203.1–203.7, 336.1, 338.1, 353; 244/3.1–3.3; 89/1.11; 342/52–55, 61–66, 342/175, 195; 343/700 R, 720, 721, 725–728, 343/781 R, 781 CA, 872
See application file for complete search history.

(56) References Cited

U.S. PATENT DOCUMENTS

| | | | | |
|---|---|---|---|---|
| 2,457,393 A | * | 12/1948 | Muffly | 244/3.16 |
| 2,961,545 A | * | 11/1960 | Merlen et al. | 250/203.7 |
| 2,972,743 A | * | 2/1961 | Svensson et al. | 342/53 |
| 3,165,749 A | * | 1/1965 | Cushner | 244/3.16 |
| 4,264,907 A | * | 4/1981 | Durand et al. | 342/53 |
| 4,282,527 A | | 8/1981 | Winderman et al. | |
| 4,477,814 A | * | 10/1984 | Brumbaugh et al. | 343/725 |
| 4,698,638 A | * | 10/1987 | Branigan et al. | 343/725 |
| 5,182,564 A | * | 1/1993 | Burkett et al. | 342/53 |
| 5,214,438 A | | 5/1993 | Brusgard et al. | |
| 5,268,680 A | * | 12/1993 | Zantos | 342/53 |
| 5,298,909 A | * | 3/1994 | Peters et al. | 343/720 |
| 5,307,077 A | * | 4/1994 | Branigan et al. | 343/720 |
| 5,327,149 A | * | 7/1994 | Kuffer | 343/720 |
| 5,841,574 A | | 11/1998 | Willey | |
| 6,060,703 A | * | 5/2000 | Andressen | 250/203.6 |

(Continued)

OTHER PUBLICATIONS

Emerson & Cumming Microwave Products, ECCOSTOCK®, Avail: http://www.eccosorb.com/america/english/page/64/eccostock, printed Feb. 1, 2008, 1pg.

(Continued)

*Primary Examiner*—Bernarr E Gregory
(74) *Attorney, Agent, or Firm*—SoCal IP Law Group LLP; John E. Gunther; Steven C. Sereboff (57) ABSTRACT

There is disclosed a multimode seeker including an imaging infrared seeker and a radio frequency seeker. The imaging infrared seeker and the radio frequency seeker may share an optical system adapted to form an infrared image of an outside scene on a focal plane array image detector and to collimate radio frequency radiation transmitted from a radio frequency transceiver and focus millimeter ware radiation received from the outside scene onto the radio frequency transceiver. The shared optical system may include a plurality of baffles to block sunlight from reaching the focal plane array image detector, each baffle comprising a material that is opaque to infrared radiation and transparent to radio frequency radiation.

12 Claims, 8 Drawing Sheets

U.S. PATENT DOCUMENTS

| | | | |
|---|---|---|---|
| 6,150,974 A * | 11/2000 | Tasaka et al. | 342/53 |
| 6,268,822 B1 * | 7/2001 | Sanders et al. | 342/54 |
| 6,307,521 B1 * | 10/2001 | Schindler et al. | 343/781 CA |
| 6,445,351 B1 * | 9/2002 | Baker et al. | 343/725 |
| 6,462,889 B1 * | 10/2002 | Jackson | 359/728 |
| 6,606,066 B1 | 8/2003 | Fawcett et al. | |
| 6,924,772 B2 * | 8/2005 | Kiernan et al. | 343/725 |
| 7,183,966 B1 * | 2/2007 | Schramek et al. | 342/53 |
| 7,492,308 B2 * | 2/2009 | Benayahu et al. | 342/52 |
| 2006/0208193 A1 * | 9/2006 | Bodkin | 250/353 |

OTHER PUBLICATIONS

World Intellectual Property Organization, International Search Report and Written Opinion for International Application No. PCT/US2009/065016, mail date Feb. 18, 2010, 7 pages.

* cited by examiner

MULTIMODE SEEKER SYSTEM WITH RF TRANSPARENT STRAY LIGHT BAFFLES

NOTICE OF COPYRIGHTS AND TRADE DRESS

A portion of the disclosure of this patent document contains material which is subject to copyright protection. The copyright owner has no objection to the facsimile reproduction by anyone of the patent disclosure as it appears in the Patent and Trademark Office patent files or records, but otherwise reserves all copyright rights whatsoever.

BACKGROUND

1. Field

This disclosure relates to multimode seekers that incorporate both radio frequency and imaging infrared sensors.

2. Description of the Related Art

Weapon systems may include a variety of imaging or non-imagining sensors to detect and track potential targets. Sensors used to guide missiles to an intended target are commonly referred to as seekers. Seekers may operate in various portions of the electromagnetic spectrum, including the visible, infrared (IR), microwave, and millimeter wave (MMW) portions of the spectrum. Some missiles may incorporate multiple sensors that operate in more than one portion of the spectrum. A seeker that incorporates multiple sensors that share a common aperture and/or common optical system is commonly called a multimode seeker.

Seekers operating in the infrared portion of the electromagnetic spectrum commonly use reflective or catadioptric (containing both reflective and refractive elements) imaging optical systems. The function of the imaging optical system is to form an image of a distant scene on a detector such as a focal plane array. Such seekers may be susceptible to stray light that may illuminate the detector and degrade the contrast or dynamic range of the image. For example, sunlight illuminating the detector may completely wash out the image of the scene formed by the imaging optical system. Thus infrared seekers may contain baffles or other mechanisms to prevent stray light from impinging on the detector. These baffles may be, for example, thin metal shields placed judiciously within the imaging optical system.

A multimode seeker system may include an imaging infrared (BR) sensor and, for example, a MMW sensor that share a common aperture and at least some elements of a reflective or catadioptric optical system. Metal stray light baffles generally cannot be used in a multimode MMW/IIR seeker since metal baffles may degrade the performance of the MMW sensor.

Throughout this description, elements appearing in figures other than flow charts are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
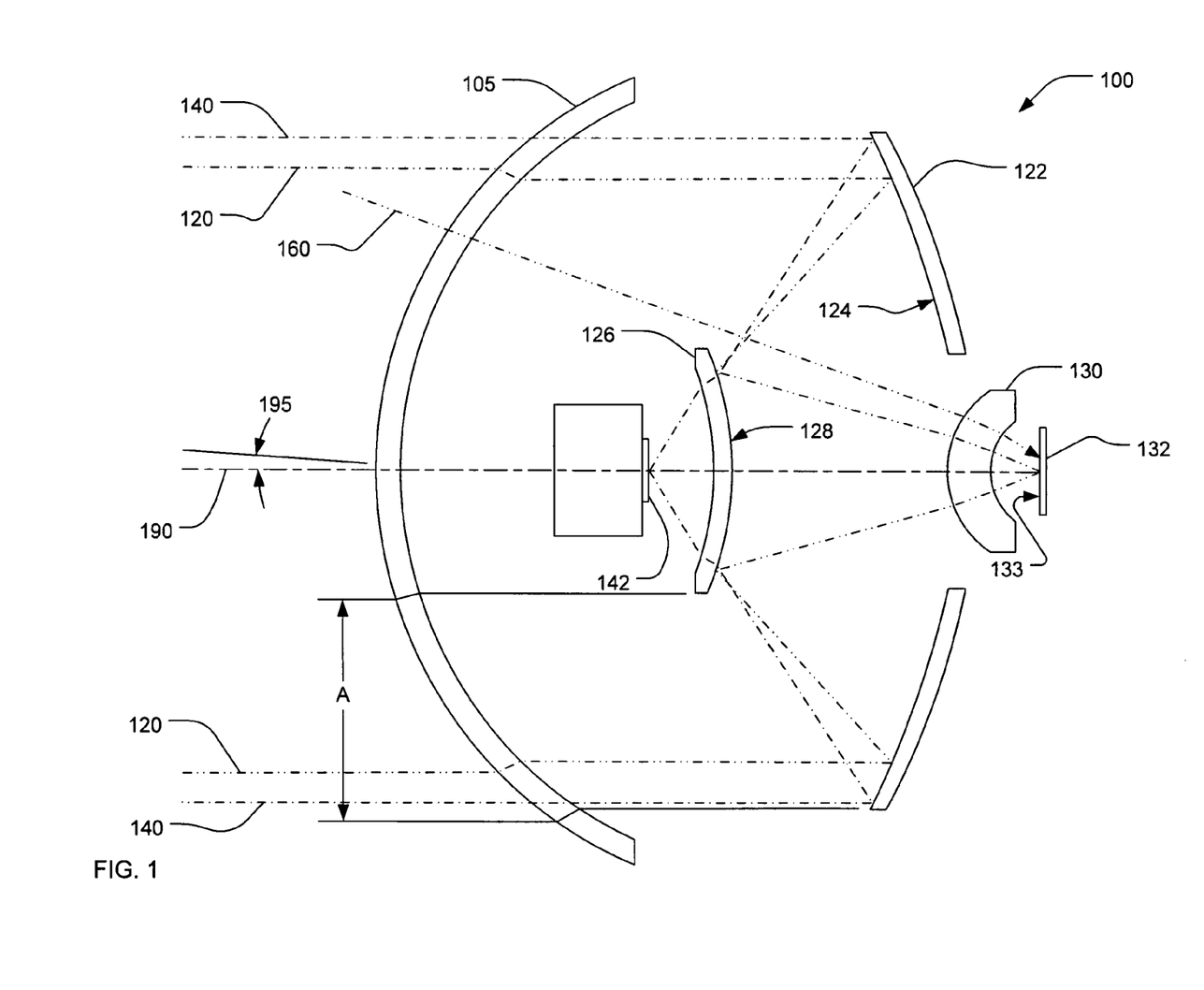
FIG. 1 is a cross-sectional schematic view of a multimode seeker system.

FIG. 1 shows the major functional components of a multimode seeker 100, which includes IIR seeker and a radio frequency (RF) seeker. FIG. 1 does not show any of the structure required to support and position the functional elements.

The IIR seeker may include a primary mirror 122, a secondary minor 126, a field lens 130, and a focal plane array 132 disposed along a common optical axis 190. Infrared radiation from a scene may pass through the dome 105, reflect from a surface 124 of the primary minor 122, reflect again from a surface 128 of the secondary minor 126, pass through the field lens 130, and impinge upon the focal plane array 132. The dome 105, the surface 124, the surface 128, and the field lens 130 may form an imaging optical system that forms an image of the outside scene at a surface 133 of the focal plane array 132. Rays 120, shown as dash-dot-dot lines, are examples of IR rays imaged onto the surface 133. The imaging optical system may have an aperture A in the form of an annular ring approximately defined, at least for rays parallel to the axis 190, by the outside diameter of the primary mirror 122 and the outside diameter of the secondary minor 126.

The IIR seeker may include the primary minor 122, the secondary mirror 126, and a re-imaging optical system (not shown). In this case, an intermediate image may be formed at an image plane at about the location of the surface 133. One or more optical elements may then form a second image at a focal plane array disposed further to the right (as shown in FIG. 1) along the common optical axis 190.

The focal plane array 132 may convert incident IR radiation into electrical signals that may be analyzed by a signal processor (not shown) to detect and track targets. The focal plane array may be sensitive to IR radiation within a selected portion of the IR spectrum, such as radiation having a wavelength of 3-5 microns, radiation having a wavelength of 8-13 microns, or some other portion of the infrared spectrum.

The RF seeker may operate in the microwave, millimeter wave, sub millimeter wave, or terahertz potions of the radio frequency spectrum. The RF seeker may operate in a selected portion of the radio frequency spectrum, such as a portion of the Ka band (26.5-40.0 GHz), the V band (40-75 GHz), the W band (75-111 GHz), or another portion of the radio frequency spectrum.

The RF seeker may include an RF transmitter/receiver (not shown) and an antenna 142 to transmit RF energy to the outside scene and to receive RF energy reflected from the outside scene. The antenna may be a single antenna element or a plurality or array of antenna elements. RF energy returning from the outside scene may reflect from the primary mirror 122, transmit through the secondary minor 126, and impinge upon the antenna 142. The reflective optical power of the primary mirror 122 and the refractive optical power of the secondary minor 126 may act in combination to collimate RF energy transmitted from the antenna 142 and to focus energy received from the outside scene onto the antenna 142. Rays 140, shown as dash-dot lines, are examples of RF rays focused onto the antenna 142.

Thus the IIR seeker and the RF seeker may share the primary minor 122 and the secondary mirror 126. The primary mirror 122 may include a surface 124 that is reflective for at least the selected portion of the RF spectrum and the selected portion of the IR spectrum. In this application, the term "reflective" means that a significant portion, but not necessarily 100%, of incident radiation is reflected. The shape of the surface 124 may be spherical, parabolic, or some other aspheric shape. The secondary mirror 126 may be transmissive to the selected portion of the RF spectrum. In this application, the term "transmissive" means that a significant portion, but not necessarily 100%, of incident radiation is transmitted through the secondary mirror 126. The secondary minor 126 may have a surface 128 that is transmissive to the selected portion of the RF spectrum but reflective for the selected portion of the IR spectrum. The shape of the surface 128 may also be spherical, parabolic, or some other aspheric shape. The secondary mirror 126 may function as a reflective element for the IIR seeker and a transmissive refractive element or lens for the RF seeker.

The IIR seeker and the RF seeker may view an outside scene through a dome 105. The dome 105 may be transmissive to the selected portion of the RF spectrum and the selected portion of the IR spectrum. The dome may function to shield the components of the seeker 100 from the outside environment and from the air stream when the missile is in flight. The dome 105 may be essentially spherical as shown in FIG. 1, or may be conical, flat, or some other shape. The shape of the dome 105 may be selected for a combination of optical and aerodynamic properties. The dome material may be glass, quartz, sapphire, or some other material selected for a combination of optical and mechanical properties.

Many of the elements shown in cross-section in FIG. 1 and subsequent cross-sectional views (FIGS. 2-3 and 5-8) may be rotationally symmetric about the optical axis 190. The dome 105, the primary minor 122, the secondary minor 128, the field lens 130, the lens 154, the aperture A, and various baffles that will be discussed subsequently may all be three-dimensional objects whose figures may be defined by rotating the corresponding cross-sectional shapes 180 degrees about the optical axis.

In FIG. 1, an oblique ray 160 is representative of stray light that may reach the focal plane array 132 along a path other than the normal path through the imaging optical system (as exemplified by the rays 120). The oblique ray 160 may be, for example, direct sunlight which may wash out and effectively obliterate all or portions of the image formed at the focal plane array 132 by the imaging optical system.

To prevent direct sunlight from degrading the performance of imaging infrared seeker systems, such systems may be adapted to prevent direct sunlight from reaching the focal plane array when the sun is positioned more than a specified minimum angle 195 from the optical axis and/or the center of the view-of-view of the seeker system. In this context, "sunlight" is defined as light from with sun that impinges on the dome 105 directly without having been scattered by any object in the outside scene. The predetermined minimum angle 195 may be called the "sun exclusion angle". For example, customer requirements on a seeker system may specify a sun exclusion angle of 10 degrees or 15 degrees or some other angle, which implies that the focal plane array must be shielded from the sunlight when the angle between the optical axis of the seeker and the sun is greater than the sun exclusion angle.

Figure 2:
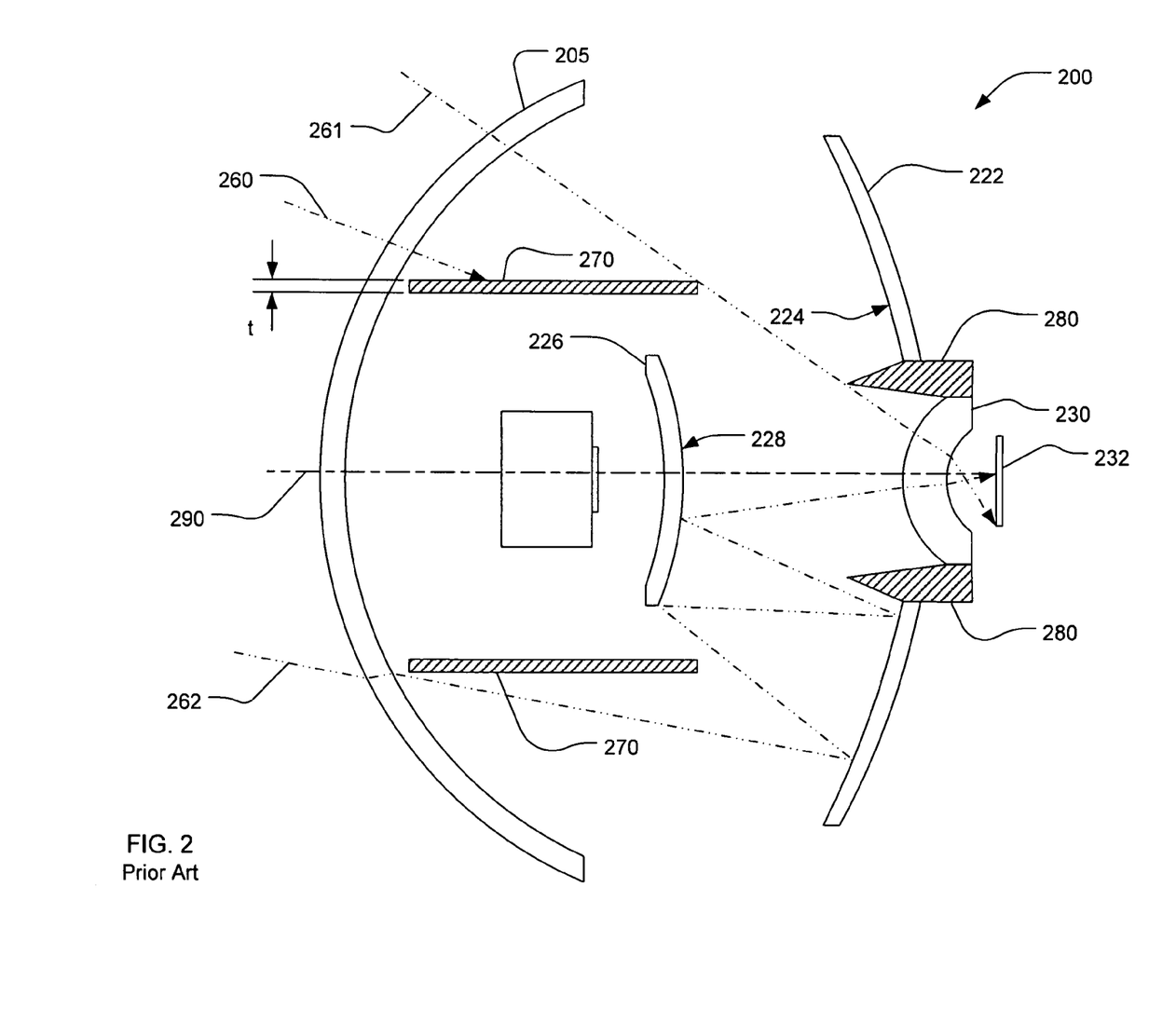
FIG. 2 is a cross-sectional schematic view of a multimode seeker system including conventional stray light baffles.

FIG. 2 and the subsequent figures are primarily concerned with preventing stray light, and sunlight in particular, from reaching the IIR focal plane array. In the interest of simplicity and clarity, portions the RF seeker which are not shared with the IIR seeker are not shown in FIG. 2 and the subsequent figures.

Referring now to FIG. 2, a multimode seeker 200, which may be the seeker 100, may conventionally include stray light baffles 270, 280. A cylindrical baffle 270 and a cone baffle 280 may be used to block direct sunlight from reaching an IIR focal plane array 232. The cylinder baffles 270 and the cone baffle 280 may be adapted to shade the focal plane array 232 from direct sunlight. The shapes and locations of the cylinder baffles 270 and the cone baffle 280 may be designed such that ray 261, the least oblique ray that can pass between the two baffles, does not impinge upon the focal plane array 232. However, the combination of a cylinder baffle 270 and a cone baffle 280 may not be effective to block sunlight, such as ray 262, which reflects twice from each of the surfaces 224 and 228 before impinging on the focal plane array 232.

The thickness t of the cylinder baffle 270 may obstruct a portion of the aperture available to the IIR seeker and thus reduce the amount of light available to form an image at the focal plane array 232. To minimize the obscuration, the thickness t of the cylinder baffle 270 may be made as small as possible. The cylinder baffle 270 of a conventional IIR seeker may be made of thin sheet metal which may provide adequate strength and rigidity for the cylinder baffle 270 while obstructing only a negligible portion of the IR seeker aperture. However, a cylinder baffle for a multimode IR and RF seeker may not be made of metal, since a metal baffle would distort and degrade the RF beam.

Stray light baffles for a multimode IR and RF seeker may be made of a material that is opaque to IR radiation and transparent to RF radiation. In this context, the term "transparent" means that the material transmits RF radiation without changing the amplitude or phase of the RF radiation sufficiently to degrade the performance of the RF seeker. A suitable material may be a dielectric material having both a near-zero loss tangent and a dielectric constant very close to 1.0 in the selected portion of the RF spectrum. The stray light baffles for a multimode IIR and RF seeker may be fabricated from a rigid plastic foam material such as ECCOSTOCK, available from Emerson & Cuming Microwave Products, and ROHACELL, available from Evonik Industries. For example, ECCOSTOCK PP dielectric foam may have a dielectric constant of 1.03 to 1.06 and a loss tangent of 0.0001. However, a cylinder baffle with thin walls may not be practical to fabricate from a rigid plastic foam material due to the fragility of thin sections of the rigid plastic foam. An easily fabricated cylinder baffle with thick rigid plastic foam walls may degrade the performance of the IIR seeker by obstructing an unacceptably large portion of the aperture. The portion of the aperture obstructed by a cylinder baffle may increase for larger angles within the field of view of the IR seeker.

Figure 3:
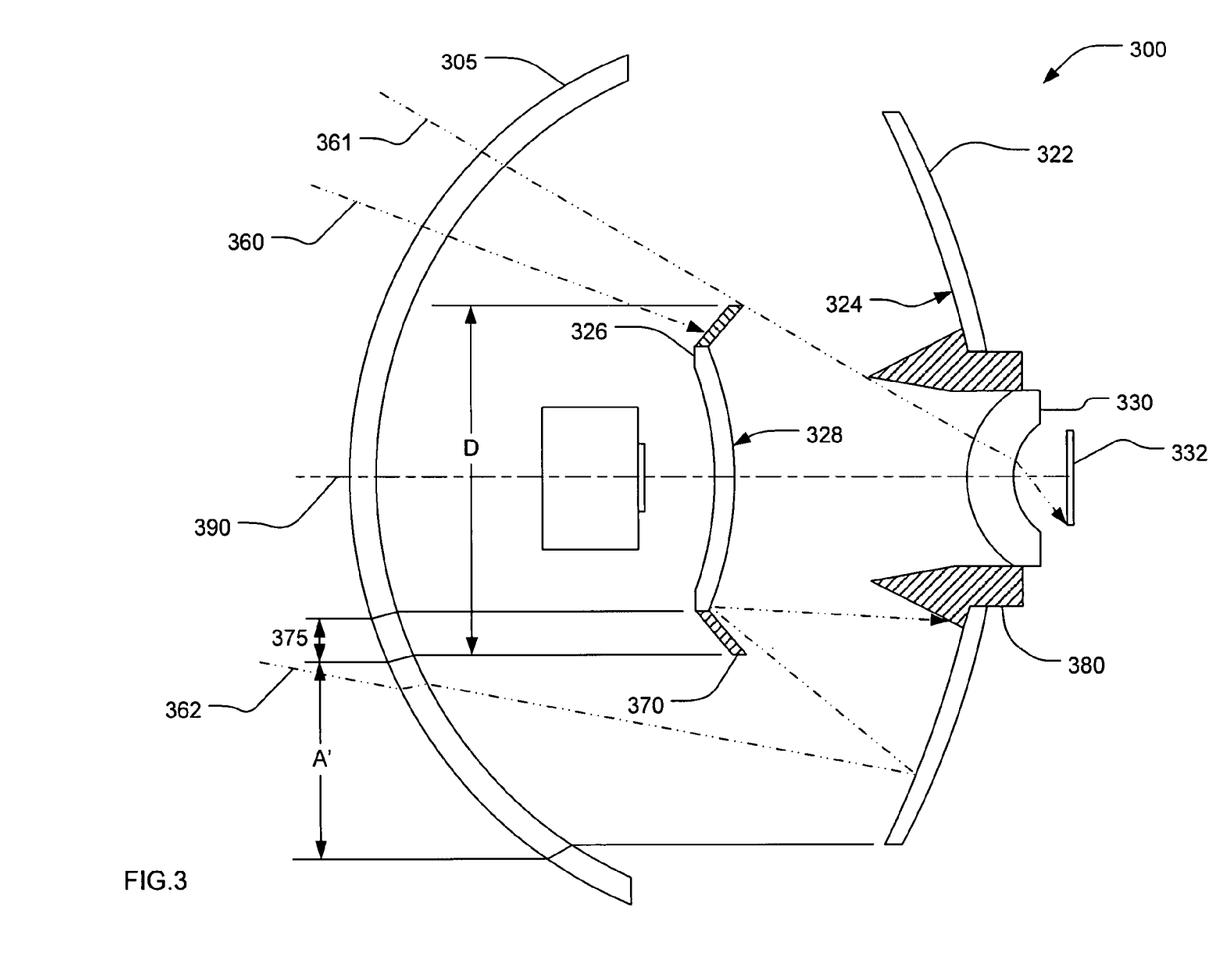
FIG. 3 is a cross-sectional schematic view of a multimode seeker system including a skirt baffle and a cone baffle.

Referring now to FIG. 3, a multimode seeker 300 may include a primary mirror 322, a secondary minor 326, a field lens 330, and a focal plane array detector 332 disposed along a common optical axis 390. The primary mirror 322 may have a surface 324 reflective to at least selected portions of the RF and IR spectrums. The secondary minor 326 may be transmissive to the selective portion of the RF spectrum. The secondary mirror 326 may have a surface 328 that is transmissive to the selection portion of the RF spectrum but efficiency reflects the selected portion of the IR spectrum. The secondary minor may function as a reflective element for the IIR seeker and a refractive element or lens for the RF seeker. The surface 324, the surface 328 and the field lens 330 may form an imaging optical system that forms an image of an outside scene at the focal plane array detector 332.

The multimode seeker 300 may include a first baffle 370, which may be termed a "skirt" baffle due to its shape, and a second baffle 380 which are effective in combination to block stray light from reaching the focal plane array detector 322. The first baffle 370 and the second baffle 380 may be adapted to block direct sunlight, such as ray 360, from reaching the focal plane array detector 322 when the sun is outside of the required sun exclusion angle. Specifically, the first baffle 370 and the second baffle 380 may be designed such that the marginal ray 361, which just misses the edges of the first baffle 370 and the second baffle 380, does not impinge upon the active area of the focal plane array 332. Further the first baffle 370 and the second baffle 380 may be effective to block sunlight, such as ray 362, which (in the absence of the baffles) may reflect twice from each of the surfaces 324 and 328 before impinging on the focal plane array 332.

The first baffle 370 and the second baffle 380 may be made of a material that is opaque to IR radiation and transparent to RF radiation. A suitable material may be a dielectric material having a near-zero loss tangent and a dielectric constant very close to 1.0 in the RF spectrum.

Since the first baffle 370 extends outward, or away from the optical axis 390, the first baffle may obstruct a central portion 375 of the aperture of the imaging optical system. With the first baffle in place, the aperture A' of the imaging optical system, at least for rays parallel to the optical axis 390, may be an annular ring approximately defined by the area between the outside diameter of the primary mirror 322 and the outside diameter D of the first baffle 370.

Figure 4:
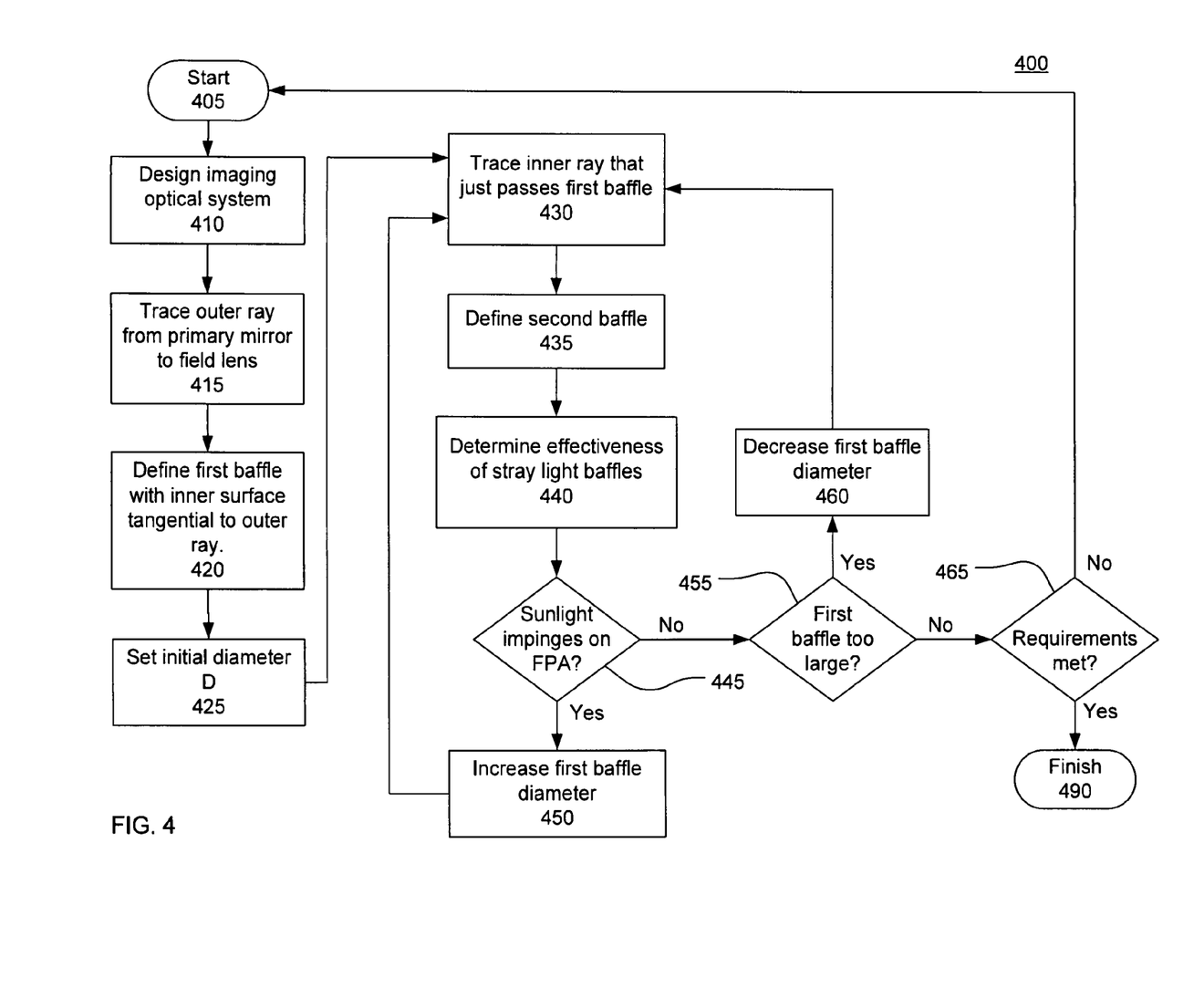
FIG. 4 is a flow chart of a process for designing stray light baffles.

The physical characteristics of the first baffle 370 and the second baffle 380 may be understood in conjunction with a description of a process 400 for designing stray light baffles for a multimode RF/IIR seeker system, as shown in FIG. 4. The process 400, shown in the flow chart of FIG. 4, will be described in conjunction with FIGS. 5, 6, and 7, which are cross-sectional schematic views of multimode seeker systems illustrating steps in the process 400.

The flow chart of FIG. 4 shows the process 400 as having a start at 405 and a finish at 490. However, the process 400 is cyclical in nature and all or portions of the process 400 may be repeated as needed to converge upon a design meeting a predetermined set of performance goals or requirements.

At 410, an imaging optical system may be designed in consideration of a set of requirements on the multimode RF/IIR seeker system. The set of requirements may include specifications for parameters such a field-of-view, magnification, sensitivity, other parameters. Well-known techniques for designing an imaging optical system may include creating a computer model of the imaging optical system, analyzing the performance of the model by tracing a large plurality of rays through the imaging optical system, and iterating the design of the model to satisfy the set of requirements. The term "ray" connotes a normal to a wavefront of light whose path through an optical system can be analytically predicted or traced.

Figure 5:
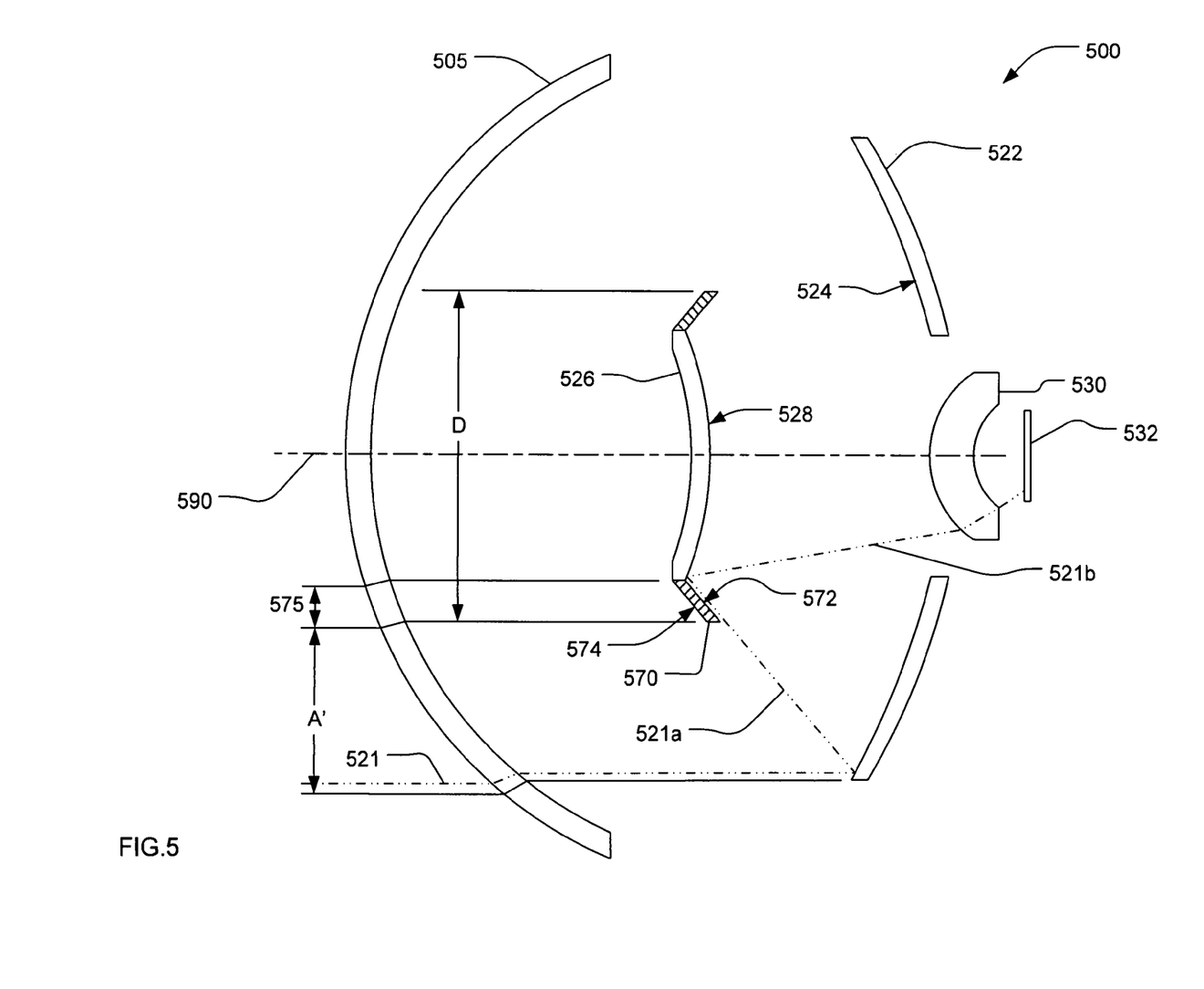
FIG. 5 is a cross-sectional schematic view of a multimode seeker system illustrating steps in the process of FIG. 4.

The imaging optical system designed at 410 may include a primary mirror 522, a secondary mirror 528, and a field lens 530, as shown in FIG. 5. The imaging optical system may be effective to form an image of a distant scene at a focal plane array detector 532.

At 415, a marginal ray may be defined. Within this description, the term "marginal ray" is defined to be a ray or rays that lie the furthest from the axis of the imaging optical system between the primary and secondary minors. In FIG. 5, ray 521 is a marginal ray which includes a segment 521a between the primary minor 522 and the secondary mirror 526, and a segment 521b between the secondary minor 526 and the field lens 530. Ray 521 is considered to be a marginal ray because the segment 521a between the primary mirror 522 and the secondary mirror 526 lies farther, or as far, from the optical axis 590 as any other ray within the aperture and field of view of the imaging optical system.

At 420, a first baffle 570 may be defined as having an inner surface 572, an outer surface 574, and an outside diameter D, as shown in FIG. 5. The first baffle may extend generally outward, or away from the optical axis, from a perimeter of the secondary mirror 526. The inner surface 572 may be an annular portion of a conical surface. Further, the inner surface 572 may be defined to be proximate to the segment 521a of the marginal ray 521. In this context, the term "proximate" means "parallel to and immediately adjacent to". The inner surface 572 may be parallel to the ray segment 521a and as close to the ray segment 521a as possible, with consideration for manufacturing tolerances, without obstructing the ray segment 521a.

The shape and location of the outer surface 574 may not be important to the function of the first baffle. The outer surface 574 of the first baffle 570 may be an annular portion of a cone and proximate to the inner surface 572, as shown in FIG. 5. The outer surface 574 may have some other shape. The shape of the outer surface 574 and the cross-sectional thickness between the inner surface 572 and the outer surface 574 may be selected to facilitate fabrication of the first baffle.

An initial value for the outside diameter D of the first baffle may be selected at 425. The selection of the initial outside diameter D may be based on judgment or experience with previous seeker designs, or may be arbitrary. The outside diameter D may be iterated (at 450 or 460) during the process 400. Thus, since the optimum value for D may be determined during the iterative process 400, the selection of the initial value of D at 425 may effect the number of design iterations but not the outcome of the process 400.

The first baffle 570 may obstruct a central portion 575 of the aperture of the infrared imaging optical system. The aperture A' of the infrared imaging optical system may be an annular ring approximately defined by the outside diameter of the primary mirror 522 and the outside diameter D of the first baffle 570. However, since the inner surface 572 of the first baffle 570 is proximate to the marginal ray 521, the first baffle 570 may allow all rays traveling from the primary minor 522 to the secondary minor 526 to pass unobstructed. Since the first baffle 570 may only obstruct rays in the central portion 575 of the aperture of the imaging optical system, the effect of the first baffle 570 on the performance of the IR seeker may be nearly constant over the field of the IR seeker. Further, since the first baffle 570 may be transparent for RF radiation, the first baffle 570 may not reduce the aperture for the RF seeker.

Figure 6:
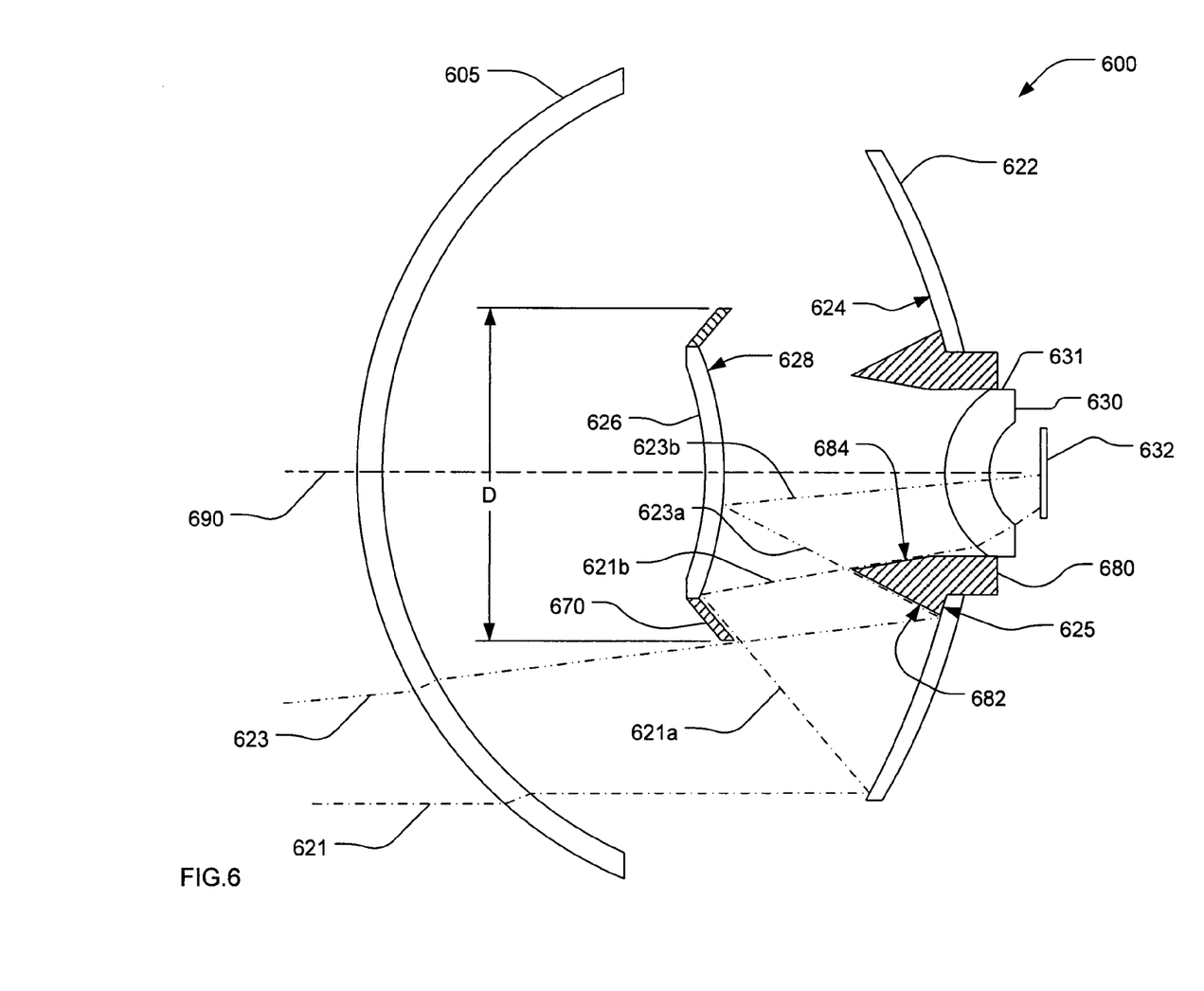
FIG. 6 is a cross-sectional schematic view of a multimode seeker system illustrating steps in the process of FIG. 4.

At 430, an inner ray may be defined. Within this description, the term "inner ray" is defined to be a ray or rays within the aperture of the infrared imaging optical system that lie the closest to the axis of the imaging optical system between the primary and secondary minors. In FIG. 6, ray 623 is an inner ray which includes a segment 623a between the primary mirror 622 and the secondary mirror 626, and a segment 623b between the secondary minor 626 and the field lens 630. Ray 623 is considered to be an inner ray because the segment 623a between the primary mirror 622 and the secondary mirror 626 lies closer to, or as close to, the optical axis 690 as any other ray within the unobstructed aperture and field of view of the imaging optical system. Since the unobstructed aperture of the infrared imaging optical system is defined, in part, by the first baffle 670, the inner ray 623 cannot be defined at 430 until the size and shape of the first baffle 670 is known from 420 and 425.

At 435, a second baffle 680 may be defined as having an inner surface 684 and an outer surface 682, as shown in FIG. 6. The second baffle 680 may extend generally forward (towards the outside scene) from a perimeter 631 of the field lens 630. The inner surface 684 of the second baffle 680 may be an annular portion of a conical surface. Further, the inner surface 684 may be proximate to the segment 621*b* of the marginal ray 621. The inner surface 684 may be parallel to the ray segment 621*b* and as close to the ray segment 621*b* as possible, with consideration for manufacturing tolerances, without obstructing the ray segment 621*b*.

The outer surface 682 of the second baffle 680 may also be an annular portion of a conical surface. Further, the outer surface 682 may be proximate to the segment 623*a* of the inner ray 623. The outer surface 682 may be parallel to the ray segment 623*a* and as close to the ray segment 623*a* as possible, with consideration for manufacturing tolerances, without obstructing the ray segment 623*a*. Since the second baffle 680 is positioned between the inner and outer rays 623 and 621, the second baffle may not obstruct any of the rays of the IIR seeker.

As shown in FIG. 6, the second baffle 680 may obstruct a portion 625 of the reflective surface 624 of the primary minor 622. However, since the second baffle may be transparent for RF radiation, the portion 625 of the surface 624 may be used by the RF seeker.

Figure 7:
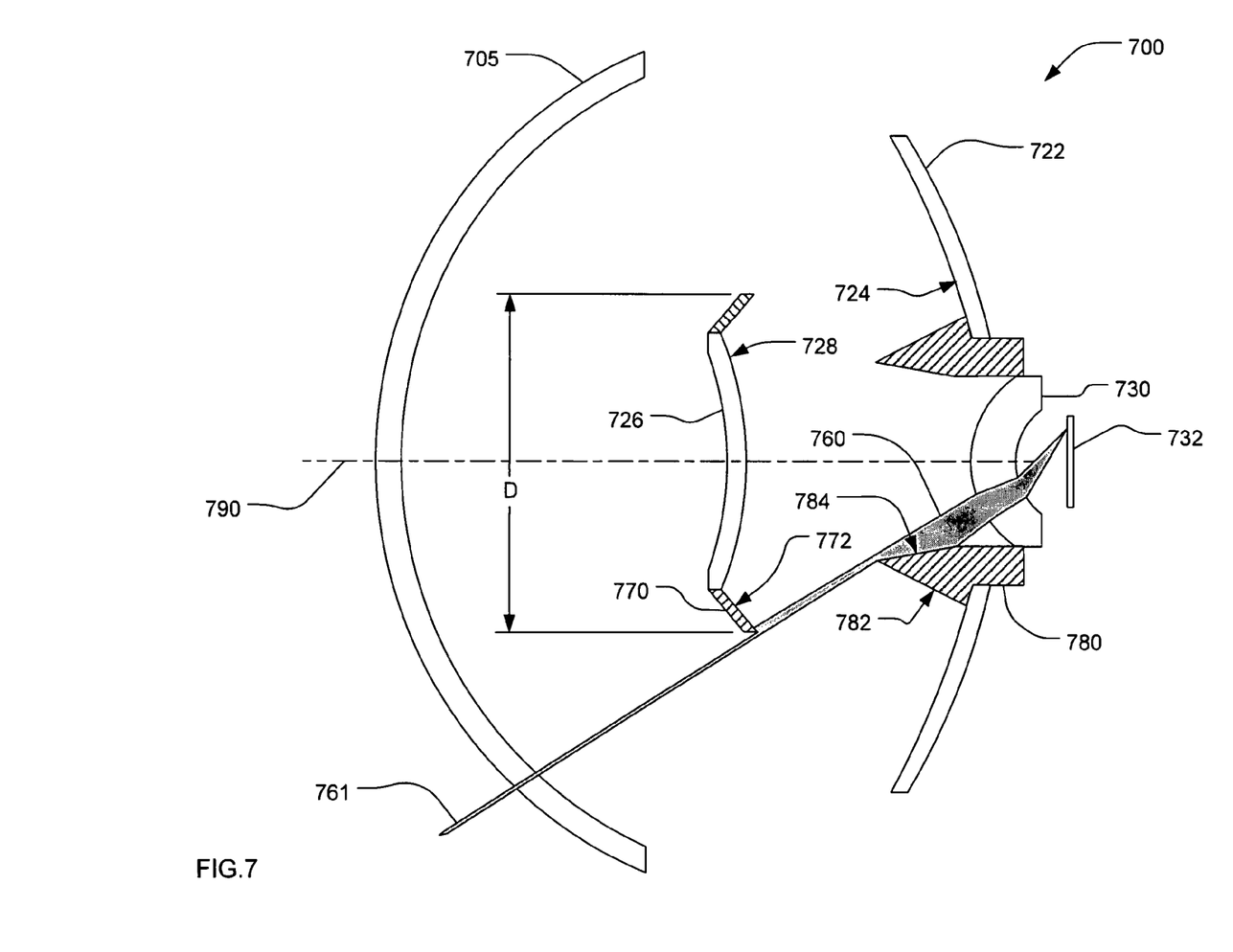
FIG. 7 is a cross-sectional schematic view of a multimode seeker system illustrating steps in the process of FIG. 4.

At 440, the effectiveness of the first baffle and the second baffle at blocking stray light may be determined. For example, the effectiveness of the first baffle and the second baffle at blocking stray light may be determined by tracing a plurality of rays outward from the focal plane array. As shown in FIG. 7, a plurality of rays, represented by shaded area 760, may be traced outward (towards the outside scene) from the focal plane array 732. A portion of the rays 760 may be obstructed by the inner surface 784 of the second baffle 780. A further portion of the rays 760 may be obstructed by the inner surface 772 of the first baffle 770. As shown in FIG. 7, a third portion 761 of the rays 760 may pass between the first and second baffles unobstructed. The reverse direction of the rays 761 defines a path that direct sunlight may follow to impinge upon the focal plane array 732. Thus, if the angle of the rays 761 with respect to the optical axis 790 is greater than a required sun exclusion angle (195 in FIG. 1), the first baffle 770 and the second baffle 780 illustrated in the example of FIG. 7 do not adequately shield the focal plane array 732 from stray light.

A similar analysis may be made to determine if sunlight, such as ray 262 in FIG. 2, can reflect twice from each of the surfaces 724 and 728 before impinging on the focal plane array 732. For example, the effectiveness of the first baffle and the second baffle at blocking sunlight may be determined by tracing a plurality of rays outward from the focal plane array 732 toward the second mirror 726. Any rays that reflect twice from each of the surfaces 724 and 728 and exit the dome 705 at an angle greater than the sun exclusion angle (195 in FIG. 1) represent a path for sunlight to impinge upon the focal plane array 732.

Returning to FIG. 4, at 445 a determination may be made if sunlight, incident at angles greater than the sun exclusion angle, may impinge upon the focal plane array (FPA) by passing directly between the first baffle and the second baffle. A further determination may be made if sunlight may impinge upon the focal plane array (FPA) by reflecting twice from each of the surfaces 724 and 728 without being obstructed by either of the first baffle and the second baffle. If the determination is made at 455 that sunlight can impinge on the FPA, the diameter D of the first baffle may be increased at 450 and the process 400 may be repeated from 430. At 450, the diameter D may be increased by a fixed or proportional amount.

Figure 8:
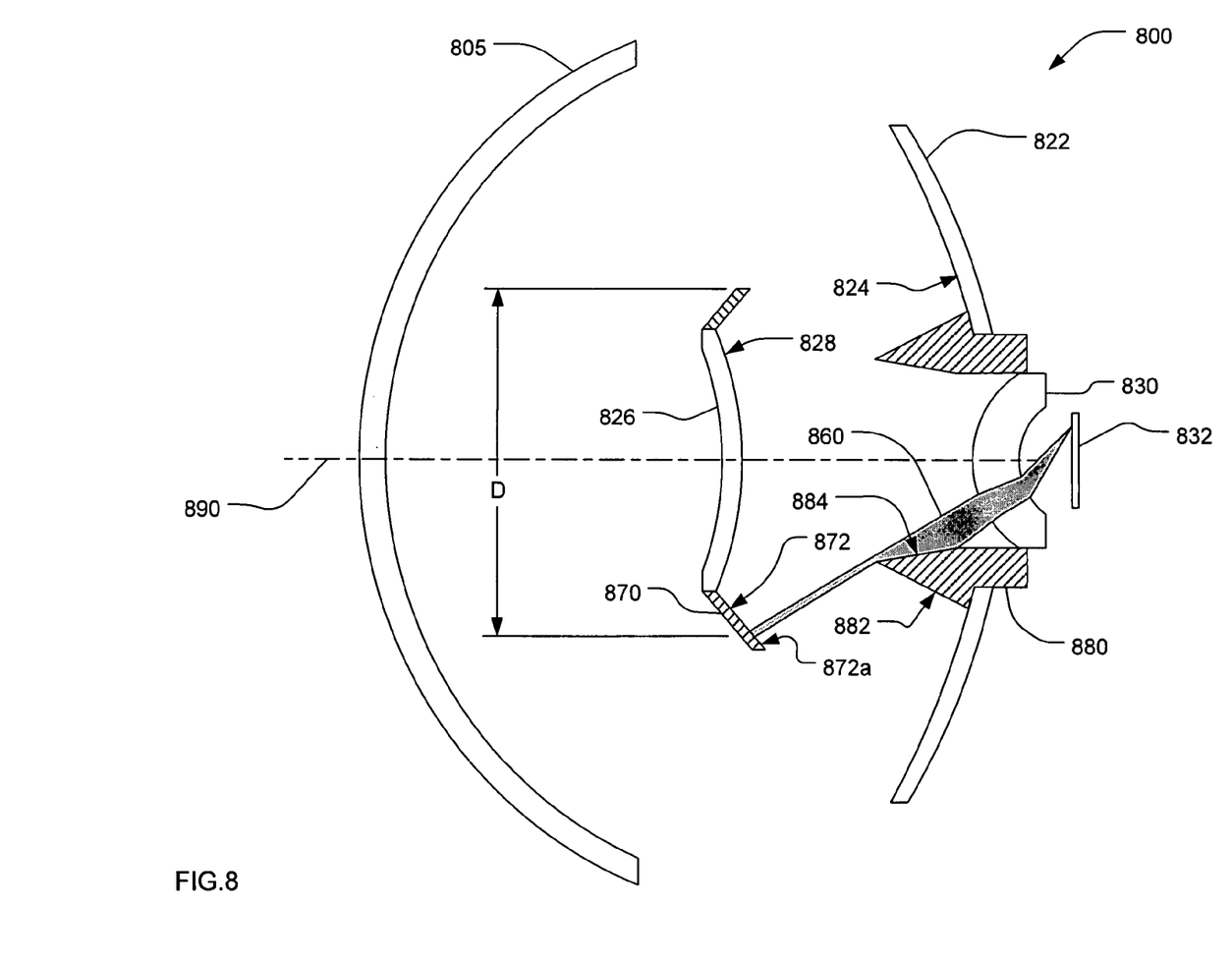
FIG. 8 is a cross-sectional schematic view of a multimode seeker system illustrating steps in the process of FIG. 4.

If the determination is made at 445 that sunlight can not directly impinge on the FPA, a determination may be made at 455 if the first baffle is larger than required and thus obstructing more of the aperture of the IIR seeker than necessary. As shown in FIG. 8, the first baffle 870 can be determined to be too large if there is a portion 872*a* of the inner surface 872 that does block any of the rays 860 traced outward from the focal plane array 832.

If a determination is made at 455 that the first baffle 870 is too large, the diameter D of the first baffle 870 may be decreased at 460 and the process 400 may be repeated from 430.

The process 400 may consider the anticipated manufacturing tolerances on the first baffle 870 and the second baffle 880. At 420 and 435, the first and second baffles, respectively, may be defined such that they do not obstruct the inner and outer rays when the dimensions of the baffles are at the maximum or largest extreme of their respective manufacturing tolerances. The determinations at 445 and 455 may be made with the assumption that the dimensions of the first and second baffles are at the minimum or lowest extreme of their respective manufacturing tolerances.

The process 400 may be repeated iteratively from 430 through 450 or 460 until a determination is made that the first and second baffles are properly sized. For example, at 425, a small value may be set for the initial value of the diameter D of the first baffle. Subsequently, the diameter D could be increased at 450 by a first incremental amount for one or more iterations until a determination is made at 455 that the first baffle is too large. The diameter D could then be decreased at 460 by a second incremental amount, smaller than the first incremental amount, for one or more iterations. Other iterative schemes may be used to converge upon a design for the first and second baffles.

When a determination is made at 455 that the first baffle and the second baffle are properly sized, a determination may be made at 465 if the design meets all requirements for the IIR seeker. The determination at 465 may require further analysis of the IR seeker as a whole (not shown). If the requirements for the IR seeker are met, the process 400 ends at 490. If the requirements are not met, the process 400 returns to 405 and restarts using different assumptions or boundaries for the imaging optical system design at 410.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of" respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A multimode seeker, comprising:
   an imaging infrared seeker including a focal plane array
   a radio frequency seeker including a radio frequency transceiver
   wherein the imaging infrared seeker and the radio frequency seeker share an optical system to
      form an infrared image of an outside scene on the focal plane array
      collimate radio frequency radiation transmitted from the radio frequency transceiver and focus radio frequency radiation received from the outside scene onto the radio frequency transceiver
   wherein the shared optical system includes a plurality of baffles to shield the focal plane array from sunlight incident at an angle greater than a predetermined sun exclusion angle, each baffle comprising a material that is opaque to infrared radiation and transparent to radio frequency radiation.

2. The multimode seeker of claim 1, wherein the shared optical system comprises:
   a primary mirror and a secondary mirror disposed along a common optical axis
      the primary mirror disposed to receive infrared and radio frequency radiation from a scene
      the secondary minor disposed to receive reflected infrared and radio frequency radiation from the primary mirror, and to reflect infrared radiation through a central aperture of the primary minor towards the focal plane array image detector.

3. The multimode seeker of claim 2, wherein
   the imaging infrared seeker operates in a selected portion of the infrared spectrum and the radio frequency seeker operates in a selected portion of the radio frequency spectrum
   the primary mirror is reflective to at least the selected portion of the infrared spectrum and reflective to at least the selected portion of the radio frequency spectrum
   the secondary mirror is reflective to the selected portion of the infrared spectrum and transmissive to the selected portion of the radio frequency spectrum.

4. The multimode seeker of claim 2, wherein the plurality of baffles comprises:
   a first baffle having a generally conical inner surface proximate to a marginal ray propagating from the primary minor to the secondary minor.

5. The multimode seeker of claim 4, wherein the first baffle extends outward from a perimeter of the secondary minor.

6. The multimode seeker of claim 4, wherein the plurality of baffles further comprises:
   a second baffle having a central aperture, a generally conical inner surface and a generally conical outer surface
      the outer surface of the second baffle proximate to an inner ray propagating from the primary minor to the secondary minor
      the inner surface of the second baffle proximate to the marginal ray propagating from the secondary minor towards the focal plane array.

7. The multimode seeker of claim 6, further comprising
   a field lens disposed along the optical axis between the secondary mirror and the focal plane image detector
   wherein the second baffle extends forward from a perimeter of the field lens.

8. The multimode seeker of claim 1, wherein the material is an optically-opaque dielectric foam.

9. An apparatus, comprising:
   a focal plane array
   an optical system to form an infrared image of an outside scene on the focal plane array, the optical system including a primary minor and a secondary minor disposed along a common optical axis
   a first baffle having a generally conical inner surface proximate to a marginal ray propagating from the primary minor to the secondary minor
   a second baffle having a central aperture, a generally conical inner surface, and a generally conical outer surface
      the outer surface of the second baffle proximate to an inner ray propagating from the primary minor to the secondary minor
      the inner surface of the second baffle proximate to the marginal ray propagating from the secondary minor towards the focal plane array.

10. The apparatus of claim 9, wherein
    the primary minor receives and reflects infrared radiation from a scene
    the secondary minor receives reflected infrared radiation from the primary mirror, and reflects infrared radiation through the central aperture of the primary minor towards the focal plane array image detector.

11. The apparatus of claim 9, wherein the first baffle extends outward from a perimeter of the secondary mirror.

12. The apparatus of claim 9, further comprising
    a field lens disposed along the optical axis between the secondary mirror and the focal plane image detector
    wherein the second baffle extends forward from a perimeter of the field lens.

* * * * *

UNITED STATES PATENT AND TRADEMARK OFFICE
CERTIFICATE OF CORRECTION

PATENT NO. : 7,786,418 B2  Page 1 of 2
APPLICATION NO. : 12/276201
DATED : August 31, 2010
INVENTOR(S) : Taylor et al.

It is certified that error appears in the above--identified patent and that said Letters Patent is hereby corrected as shown below:

Column 1, line 45: replace "(BR)" with --(IIR)--
Column 2, line 22: replace "minor" with --mirror--
Column 2, line 25: replace "minor" with --mirror--
Column 2, line 26: replace "minor" with --mirror--
Column 2, line 36: replace "minor" with --mirror--
Column 2, line 37: replace "minor" with --mirror--
Column 2, line 64: replace "minor" with --mirror--
Column 2, line 67: replace "minor" with --mirror--
Column 3, line 6: replace "minor" with --mirror--
Column 3, line 18: replace "minor" with --mirror--
Column 3, line 40: replace "primary minor" with --primary mirror--
Column 3, line 40: replace "secondary minor" with --secondary mirror--
Column 4, line 32: replace "IR" with --IIR--
Column 4, line 33: replace "IR" with --IIR--
Column 4, line 36: replace "IR" with --IIR--
Column 4, line 60: replace "minor" with --mirror--
Column 4, line 64: replace "minor" with --mirror--
Column 5, line 2: replace "minor" with --mirror--
Column 6, line 4: replace "minors" with --mirrors--
Column 6, line 6: replace "minor" with --mirror--
Column 6, line 7: replace "minor" with --mirror--
Column 6, line 50: replace "minor" with --mirror--
Column 6, line 51: replace "minor" with --mirror--
Column 6, line 54: replace "IR" with --IIR--
Column 6, line 55: replace "IR" with --IIR--
Column 6, line 62: replace "minors" with --mirrors--
Column 6, line 65: replace "minor" with --mirror--
Column 7, line 30: replace "minor" with --mirror--
Column 8, line 48: replace "IR" with --IIR--
Column 8, line 49: replace "IR" with --IIR--
Column 9, line 53: replace "minor" with --mirror--

Signed and Sealed this

Thirtieth Day of November, 2010

David J. Kappos
*Director of the United States Patent and Trademark Office*

CERTIFICATE OF CORRECTION (continued)
U.S. Pat. No. 7,786,418 B2

Column 9, line 56: replace "minor" with --mirror--
Column 10, line 11: replace "minor" with --mirror--
Column 10, line 13: replace "minor" with --mirror--
Column 10, line 19: replace "minor" with --mirror--
Column 10, line 20: replace "minor" with --mirror--
Column 10, line 22: replace "minor" with --mirror--
Column 10, line 35: replace "primary minor" with --primary mirror--
Column 10, line 35: replace "secondary minor" with --secondary mirror--
Column 10, line 39: replace "minor" with --mirror--
Column 10, line 39: replace "secondary minor" with --secondary mirror--
Column 10, line 43: replace "minor" with --mirror--
Column 10, line 44: replace "minor" with --mirror--
Column 10, line 46: replace "minor" with --mirror--
Column 10, line 49: replace "minor" with --mirror--
Column 10, line 51: replace "minor" with --mirror--
Column 10, line 53: replace "minor" with --mirror--